United States Patent
Srinivasan et al.

(10) Patent No.: US 10,664,258 B2
(45) Date of Patent: May 26, 2020

(54) SYSTEMS AND METHODS FOR UPDATING AIRCRAFT DATA BASED ON LOCATION OF AIRCRAFT

(71) Applicant: Honeywell International Inc., Morris Plains, NJ (US)

(72) Inventors: Divya Swarup Giriyappa Srinivasan, Bangalore (IN); David B. Goldstein, Washington, NJ (US); Dilip Mathews, Bangalore (IN); Karthik Rao, Bangalore (IN); Satish Kumar Rajendran, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 71 days.

(21) Appl. No.: 15/336,516

(22) Filed: Oct. 27, 2016

(65) Prior Publication Data

US 2018/0121188 A1    May 3, 2018

(51) Int. Cl.
*G06F 8/65* (2018.01)
*H04B 7/185* (2006.01)

(52) U.S. Cl.
CPC .......... *G06F 8/65* (2013.01); *H04B 7/18506* (2013.01)

(58) Field of Classification Search
CPC .............................. G06F 8/65; H04B 7/18506
USPC ........................................................ 717/171
See application file for complete search history.

(56) References Cited

U.S. PATENT DOCUMENTS

| | | | | |
|---|---|---|---|---|
| 6,438,468 B1* | 8/2002 | Muxlow | ............. | G08G 5/0013 701/29.1 |
| 7,366,589 B2* | 4/2008 | Habermas | ................. | G06F 8/65 701/1 |
| 7,908,042 B2* | 3/2011 | Brinkley | ............ | H04B 7/18506 342/29 |
| 8,055,393 B2* | 11/2011 | Sims, III | ................... | G06F 8/64 701/3 |
| 8,063,798 B2* | 11/2011 | Cernasov | ............... | G01C 23/00 340/963 |
| 8,682,509 B2* | 3/2014 | Goodrich | ............... | G07C 5/008 340/10.1 |
| 9,086,941 B1* | 7/2015 | Siegel | ....................... | G06F 8/65 |

(Continued)

FOREIGN PATENT DOCUMENTS

EP    1 426 870 A2    6/2004

OTHER PUBLICATIONS

"747-8 Ground Wireless System", Nov. 4, 2009, pp. 1-12.
(Continued)

*Primary Examiner* — Lewis A Bullock, Jr.
*Assistant Examiner* — Theodore E Hebert
(74) *Attorney, Agent, or Firm* — Bookoff McAndrews, PLLC (57) ABSTRACT

A method for updating aircraft data is provided. The method comprises: receiving one or more messages at a ground system that one or more aircraft is in a safe state on the ground; selecting one or more aircraft in the safe state to receive a software or database update from the ground system; verifying that the selected one or more aircraft in the safe state is in need of the software or database update; initiating a remote loading of the software or database update to the verified selected one or more aircraft in the safe state; and receiving one or more messages at the ground system from the verified selected one or more aircraft indicating a status of the remote loading.

20 Claims, 6 Drawing Sheets

(56) References Cited

U.S. PATENT DOCUMENTS

| | | | | | |
|---|---|---|---|---|---|
| 9,207,954 | B2* | 12/2015 | Mood | | G06F 9/44505 |
| 2002/0090946 | A1* | 7/2002 | Mielke | | H04B 7/18506 |
| | | | | | 455/435.1 |
| 2002/0111720 | A1* | 8/2002 | Holst | | G06F 8/61 |
| | | | | | 701/3 |
| 2003/0130769 | A1* | 7/2003 | Farley | | H04B 7/18506 |
| | | | | | 701/3 |
| 2005/0228558 | A1* | 10/2005 | Valette | | G07C 5/008 |
| | | | | | 701/33.4 |
| 2006/0129289 | A1* | 6/2006 | Kumar | | B60L 11/123 |
| | | | | | 105/26.05 |
| 2006/0229772 | A1* | 10/2006 | McClary | | G06F 8/64 |
| | | | | | 701/3 |
| 2007/0027589 | A1* | 2/2007 | Brinkley | | G08G 5/0013 |
| | | | | | 701/3 |
| 2009/0138873 | A1* | 5/2009 | Beck | | G06F 8/61 |
| | | | | | 717/173 |
| 2009/0157703 | A1* | 6/2009 | Henninger | | G01C 23/00 |
| 2009/0187976 | A1* | 7/2009 | Perroud | | H04B 7/18506 |
| | | | | | 726/4 |
| 2010/0083242 | A1* | 4/2010 | Altstaedt | | G06F 8/65 |
| | | | | | 717/169 |
| 2010/0235289 | A1* | 9/2010 | Frayssignes | | G06F 8/65 |
| | | | | | 705/304 |
| 2011/0054721 | A1* | 3/2011 | Goodrich | | G05B 23/0283 |
| | | | | | 701/14 |
| 2013/0067450 | A1* | 3/2013 | Saugnac | | G06F 8/65 |
| | | | | | 717/170 |
| 2013/0247025 | A1* | 9/2013 | Barberet | | G06F 8/65 |
| | | | | | 717/173 |
| 2013/0305238 | A1* | 11/2013 | Frayssignes | | G06F 8/65 |
| | | | | | 717/173 |
| 2014/0136658 | A1* | 5/2014 | Wahler | | H04B 7/18508 |
| | | | | | 709/218 |
| 2016/0285542 | A1* | 9/2016 | Du | | B64D 11/0015 |
| 2017/0178420 | A1* | 6/2017 | Byrd, Jr. | | G07C 5/008 |

OTHER PUBLICATIONS

"Frequently Asked Questions—Airlines", retrieved Sep. 6, 2016 from https://www.rockwellcollins.com/Services_and_Support/ Information_Management/ARINC_Airports/Airport-Airline_ Operations/~/media/, Apr. 12, 2011, pp. 1-5.

Gosling, "E-Enabled Capabilities of the 787 Dreamliner", Feb. 4, 2009, pp. 22-24.

Sampigethaya et al., "Secure Operation, Control and Maintenance of Future E-enabled Airplanes", Jan. 2009, pp. 1-13, Publisher: IEEE.

Wittry et al., "NASA, FAA demonstrate wireless communication with aircraft", Phys Org, May 10, 2016, pp. 1-2.

Extended European Search Report dated Mar. 12, 2018 in European Application No. 17197773.9 (8 pages).

* cited by examiner

SYSTEMS AND METHODS FOR UPDATING AIRCRAFT DATA BASED ON LOCATION OF AIRCRAFT

BACKGROUND

Currently, an avionics software or database update is done by a dataload, which is initiated using a data loader by an aircraft maintenance engineer who is physically required to be present in the vicinity of the aircraft. The maintenance engineer has no mechanism indicating what software or database version is available on the aircraft, nor what software or database version is available on a data loader present in an aircraft equipped with a wireless gateway.

SUMMARY

A method for updating aircraft data is provided. The method comprises: receiving one or more messages at a ground system that one or more aircraft is in a safe state on the ground; selecting one or more aircraft in the safe state to receive a software or database update from the ground system; verifying that the selected one or more aircraft in the safe state is in need of the software or database update; initiating a remote loading of the software or database update to the verified selected one or more aircraft in the safe state; and receiving one or more messages at the ground system from the verified selected one or more aircraft indicating a status of the remote loading.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system is provided for tracking an aircraft with an older version of software/database, and initiating an autoload of the latest version of the software/database when the aircraft is in safe state for dataload. The present method provides for determining which software/database version is currently installed on the aircraft, and provides various approaches for remotely installing an updated software/database on the aircraft. The present method allows maintenance personnel in a ground operations center to initiate remote dataloading of software/database updates to one or more aircraft, without having to be at or near the aircraft.

Further details of the present method and system are described hereafter with reference to the drawings.

Figure 1:
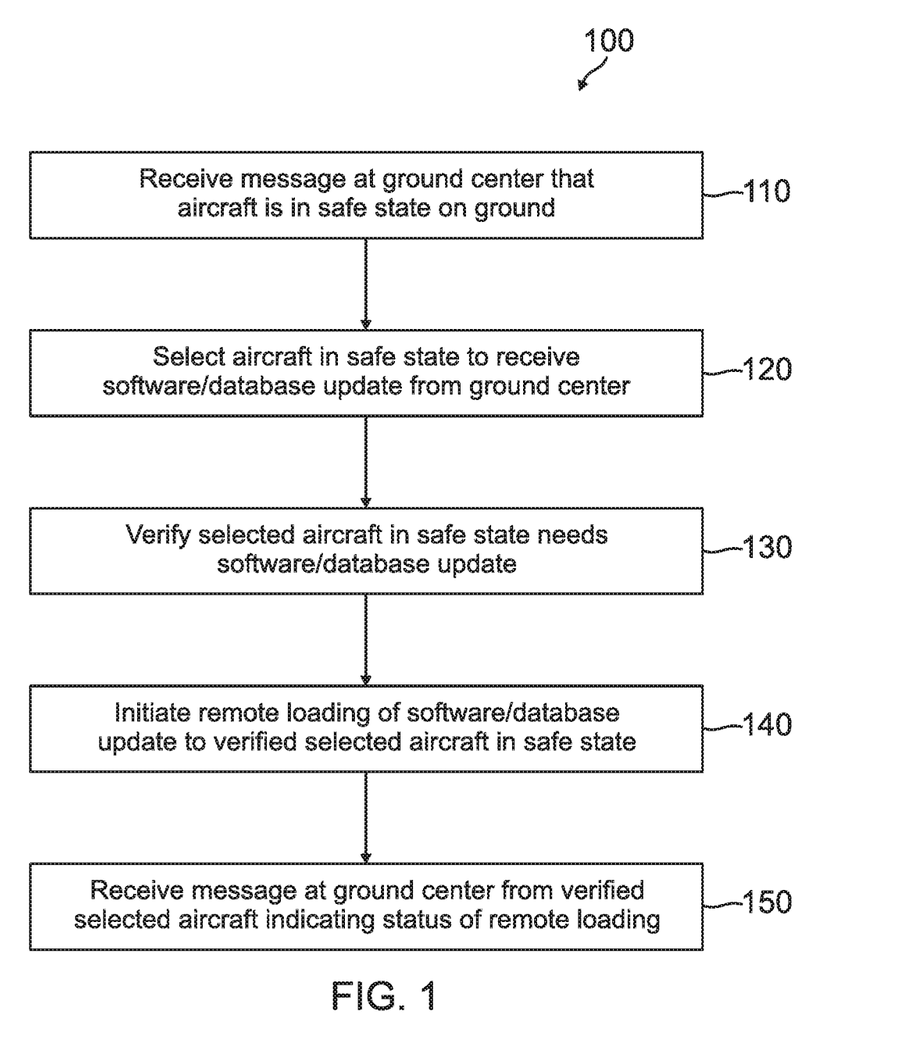
FIG. 1 is a flow diagram of a method for updating aircraft data, according to one implementation.

FIG. 1 is a flow diagram of a method 100 for updating aircraft data, according to one implementation. Initially, one or more messages are received at a ground center that one or more aircraft is in a safe state on the ground (block 110), such as at a gate. One or more aircraft in the safe state is then selected to receive a software or database update from the ground center (block 120). The method 100 then verifies that the selected aircraft in the safe state is in need of the software or database update (block 130). The method 100 thereafter initiates a remote loading of the software or database update to the verified selected aircraft in the safe state (block 140). One or more messages are received at the ground center from the verified selected aircraft indicating a status of the remote loading (block 150).

Figure 2:
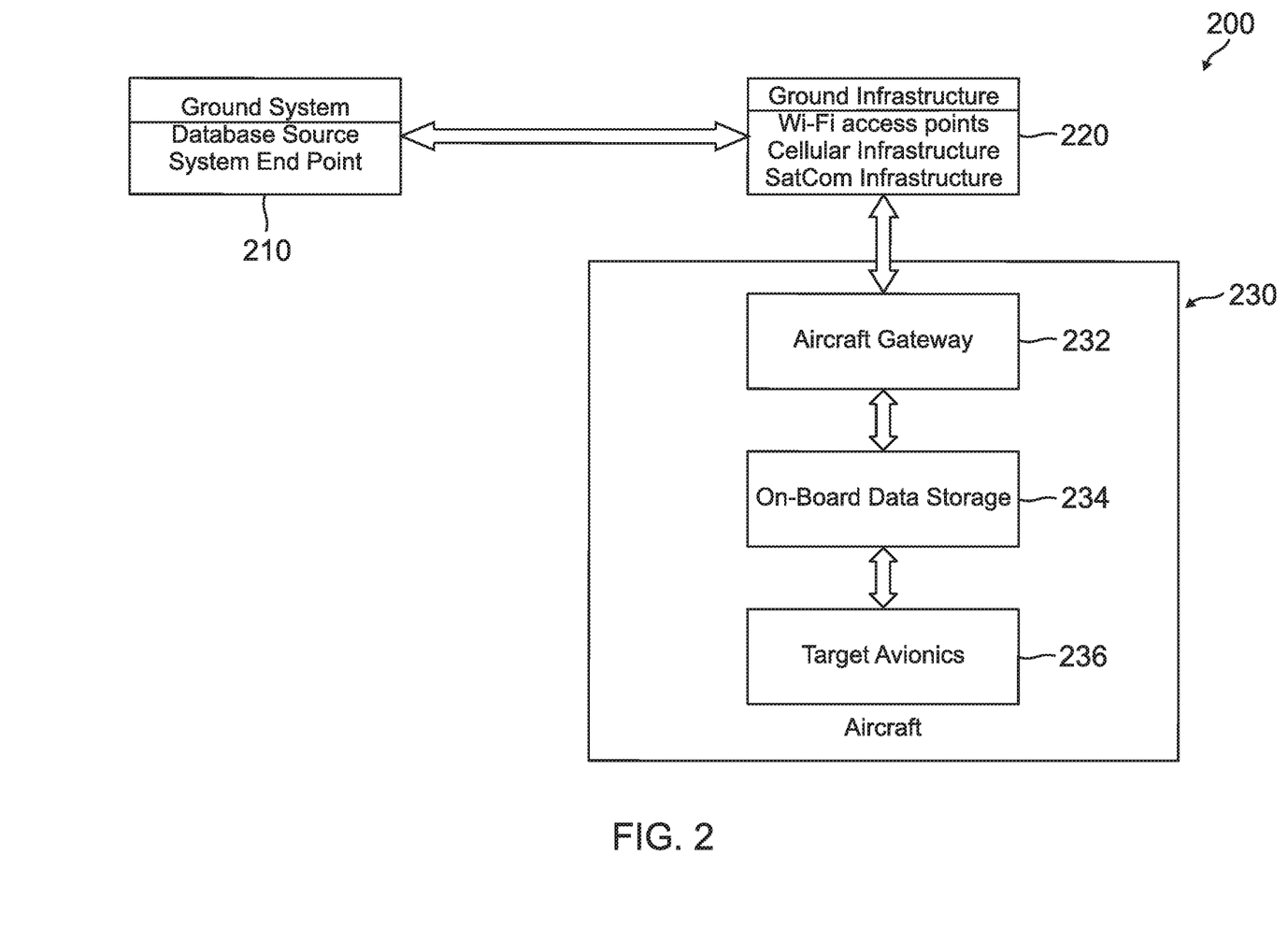
FIG. 2 is a block diagram of an exemplary system for updating aircraft data, according to one embodiment.

FIG. 2 illustrates an exemplary system 200, which can be employed for updating aircraft data, according to one embodiment. The system 200 generally comprises a ground system 210, which can include one or more database sources, as well as a system end point at a ground center. The ground system 210 is in operative communication with a ground infrastructure 220, which can include Wi-Fi access points, cellular infrastructure, satellite communications (SatCom) infrastructure, and the like.

The ground infrastructure 220 is configured for operative communication with one or more aircraft, such as an aircraft 230, which is located on the ground in a safe state, such as parked at an airport terminal gate. The aircraft 230 includes an aircraft gateway 232, which is configured to communicate with ground infrastructure 220, such as through a wireless connection. The aircraft gateway 232 is in operative communication with an on-board data storage 234, which operatively communicates with one or more target avionics 236.

In order to update the aircraft data for aircraft 230, a message is sent from aircraft gateway 232 to ground system 210 through ground infrastructure 220 that aircraft 230 is in a safe state on the ground. The aircraft 230 is selected to receive a software or database update after verification that aircraft 230 is in need of the update. Remote loading of the software or database update is then initiated from ground system 210, which sends the update through ground infrastructure 220 to aircraft 230. The software or database update is received by aircraft gateway 232 and is then sent to on-board data storage 234. The update is then sent to the appropriate target avionics 236.

Figure 3:
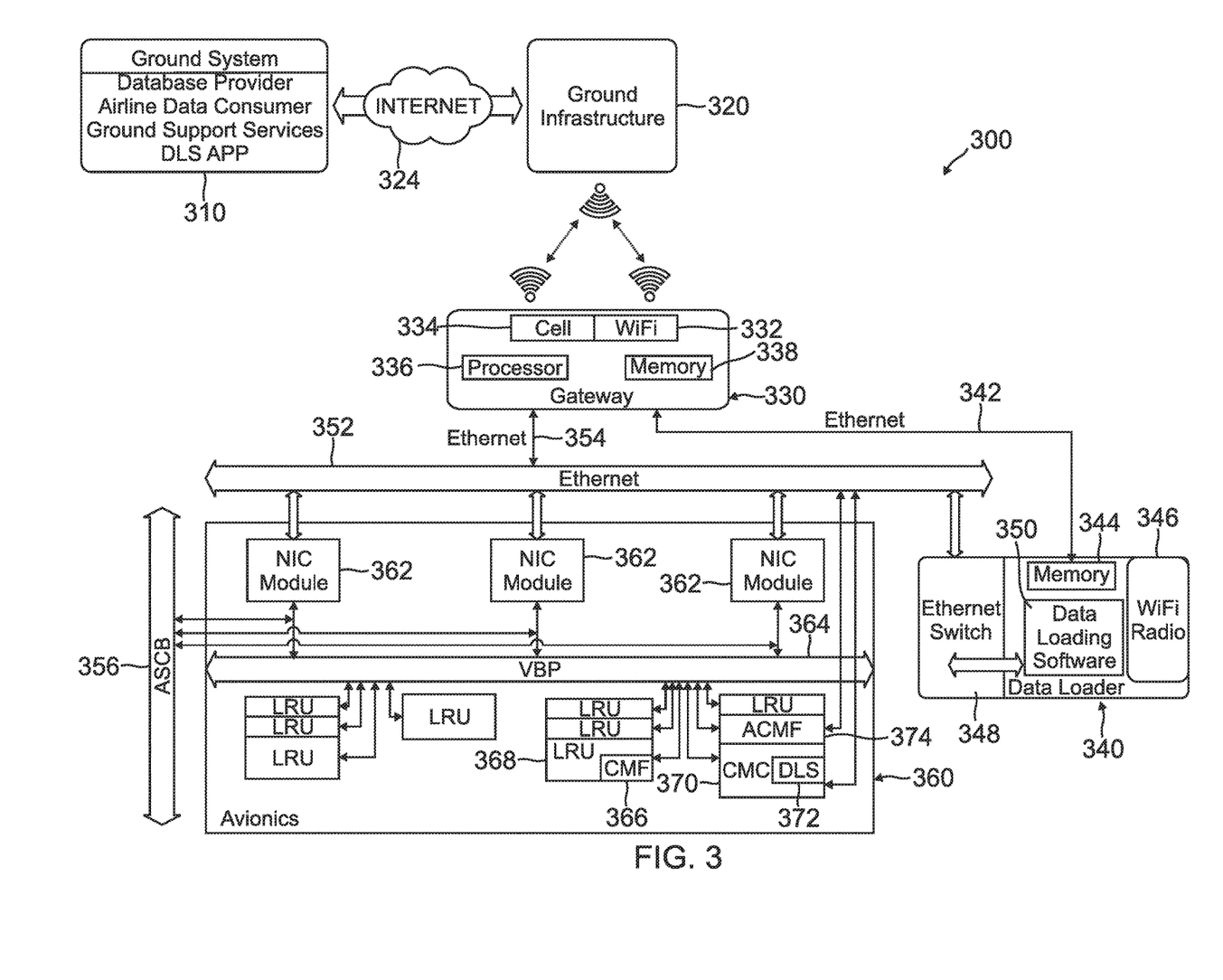
FIG. 3 is a block diagram of system architecture for updating aircraft data, according to one example embodiment.

FIG. 3 illustrates a system architecture 300, which can be employed for updating aircraft data, according to one example embodiment. The system architecture 300 includes a ground system 310, which can include at least one database provider, at least one airline data consumer, ground support services, and the like. The ground system 310 also includes an operations ground center where a data loading software application (DLS App) is located for remote operation.

The ground system 310 is in operative communication with a ground infrastructure 320, such as through the Internet 324. The ground infrastructure 320 can include Wi-Fi access points, cellular infrastructure, SatCom infrastructure, and the like. The ground infrastructure 320 is configured for operative communication with one or more aircraft located on the ground in a safe state.

An onboard gateway 330 on the aircraft is the aircraft gateway and is configured to wirelessly communicate with ground infrastructure 320. The onboard gateway 330 includes respective Wi-Fi and cellular communication devices 332, 334, as well as a processor 336 and a memory unit 338. The onboard gateway 330 operatively communicates with an onboard data loader 340, such as through an Ethernet connection 342. The data loader 340 includes a memory unit 344, a WiFi radio 346, an Ethernet switch 348, and data loading software 350.

An avionics system 360 onboard the aircraft operatively communicates with data loader 340, such as through an Ethernet bus 352 that is connected to Ethernet switch 348. The avionics system 360 also operatively communicates with onboard gateway 330, such as through an Ethernet connection 354 coupled to Ethernet bus 352. The avionics system 360 includes a set of network interface controller (NIC) modules 362, which communicate with Ethernet bus 352 and also communicate with an avionics standard communications bus (ASCB) 356.

A plurality of line replaceable units (LRUs) in avionics system 360 operatively communicate with NIC modules 362 through a virtual backplane (VBP) bus 364. A communications management unit (CMU) or communication management function (CMF) 366 in avionics system 360 is associated with an LRU 368, which communicates with VBP bus 364. A central maintenance computer (CMC) 370 in avionics system 360 includes data loading software (DLS) 372. The CMC 370 is in communication with Ethernet bus 352 and VBP bus 364. An aircraft condition monitoring system (ACMS) or aircraft condition monitoring function (ACMF) 374 in avionics system 360 is in communication with Ethernet bus 352 and VBP bus 364.

In one method for performing an update operation using system architecture 300, ground system 310 notifies an LRU on the aircraft that a software/database update is available, and the LRU requests data loader 340 to initiate a dataload of the update when a maintenance mode is entered. For example, ground system 310 can send an auto update command by way of a datalink uplink using CMF 366 in the aircraft. The CMF 366 will forward/route the auto update command to the respective LRUs on the aircraft for which the software/database update is needed. Each LRU will save this auto update command and wait for the LRU to enter a maintenance mode. As soon as the maintenance mode is entered, the LRU will automatically request data loader 340 to initiate the dataload update.

In another method for performing an update operation using system architecture 300, CMF 366 monitors a broadcast discrete of an LRU operation state (normal mode or maintenance mode) on the aircraft. When an LRU status enters a maintenance mode (or dataload mode), CMF 366 informs ground system 310 using a datalink message indicating the LRU is available for maintenance (dataload). The ground system 310 can command data loader 340 through CMF 366 using a datalink uplink to initiate the dataload update. Alternatively, ground system 310 can command data loader 340 through onboard gateway 330 to initiate the dataload update.

Figure 4:
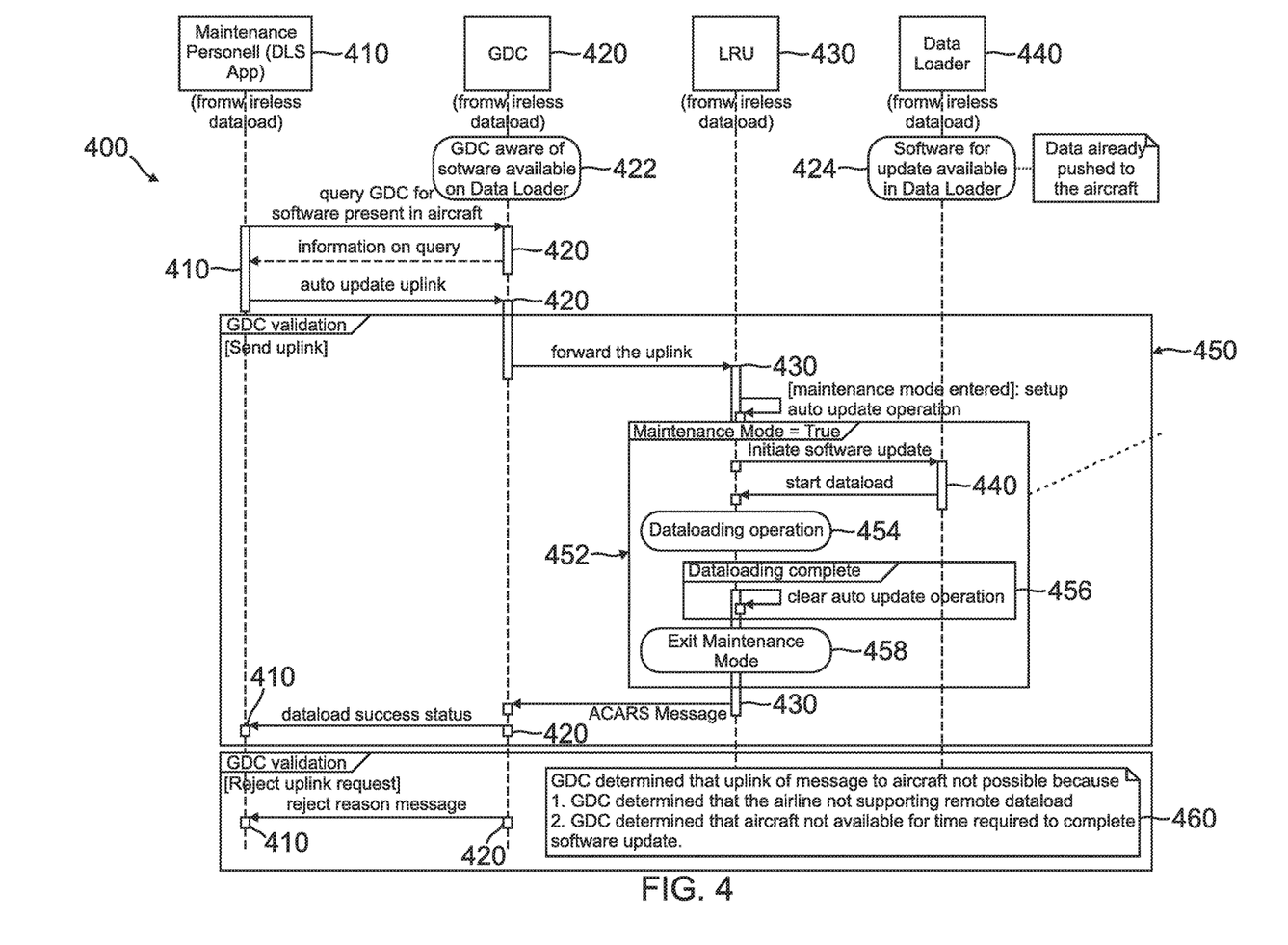
FIG. 4 is an operational flow diagram of one exemplary method for updating aircraft data using a remote wireless dataload.
Figure 5:
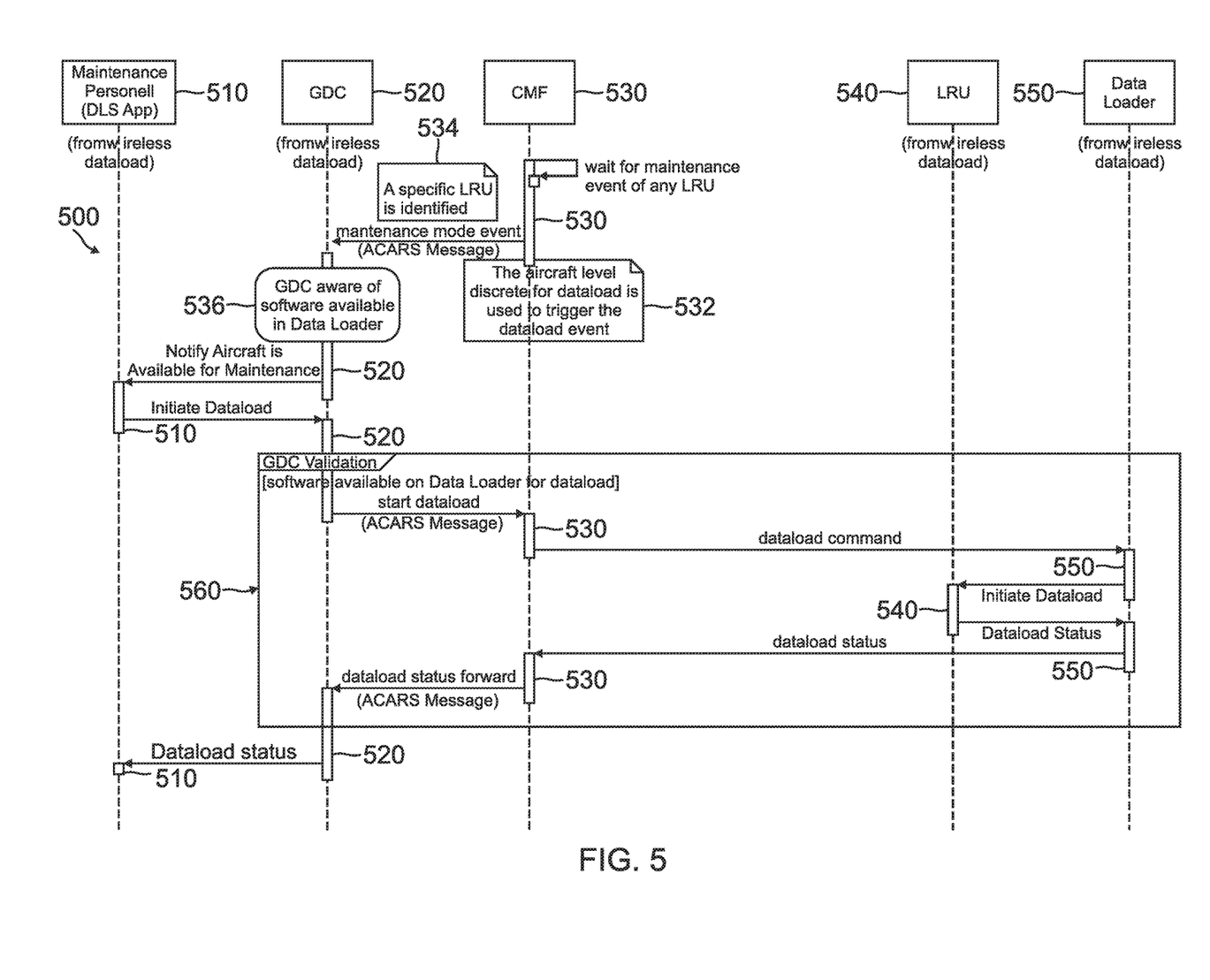
FIG. 5 is an operational flow diagram of another exemplary method for updating aircraft data using a remote wireless dataload.
Figure 6:
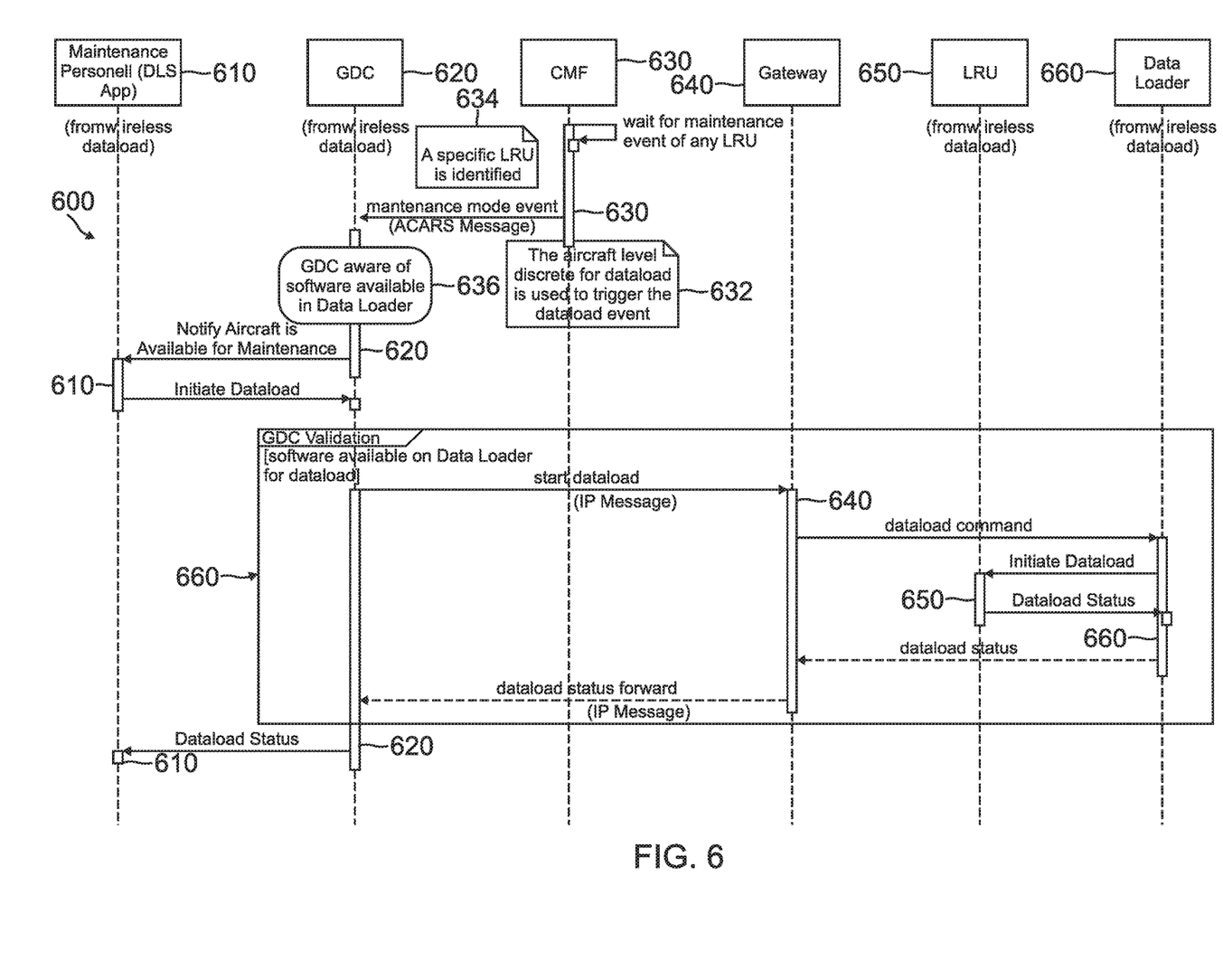
FIG. 6 is an operational flow diagram of an alternative exemplary method for updating aircraft data using a remote wireless dataload.

FIGS. 4-6 are operational flow diagrams showing further details of the various alternative methods for updating aircraft data using a wireless dataload.

In a first updating method 400 shown in FIG. 4, maintenance personnel, by way of a DLS App (block 410), interact with a ground data center (GDC) (block 420), which in turn operatively communicates with at least one LRU (block 430) and a data loader (block 440) onboard an aircraft. The method 400 can provide a control dataload method for one or more aircraft LRUs, for example.

In method 400, the DLS App is used to send a query to the GDC regarding the current software in an aircraft of interest. The GDC is aware of the software available on the data loader (block 422) in the aircraft. In addition, the software for the update is available in the data loader, as the data has already been pushed to the aircraft (block 424). After receiving information from the GDC on the query, the DLS App is used to initiate an auto update uplink, which is sent to the GDC to perform a GDC validation operation at 450. If valid, the GDC forwards the uplink to the LRU, which notifies the LRU that a software/database update is available, and a maintenance mode is entered at 452 to set up an auto update operation. The LRU requests the data loader to initiate the software update when ready. The dataload is started, and the dataloading operation is carried out (block 454). The software used in the maintenance mode for dataloading is proactive and uses a "pull" method for the update. This means that the LRU has some logic that determines which software in the LRU may be updated.

When the dataloading is complete at 456, the auto update operation is cleared, and the maintenance mode is exited (block 458). A status message such as an ACARS message is sent from the LRU to the GDC, which in turn sends a dataload success status message to the DLS App.

The GDC validation can determine that the uplink request is to be rejected (block 460). For example, the GDC validation can determine that uplink of the message to the aircraft is not possible because: the GDC has determined that the airline does not support remote dataloading; or the GDC has determined that the aircraft is not available for the time required to complete the software update.

In another updating method 500 depicted in FIG. 5, maintenance personnel, by way of a DLS App (block 510), interact with a GDC (block 520), which in turn operatively communicates with various aircraft components, including a CMF (block 530), at least one LRU (block 540), and a data loader (block 550).

During method 500, the CMF monitors a broadcast discrete of an LRU operation state (normal mode or maintenance mode), and waits for a maintenance event of any LRU on the aircraft. For example, the aircraft level discrete for dataload can be used to trigger the dataload event (block 532). During a maintenance mode event, a specific LRU is identified for the update (block 534), and a datalink message such as an ACARS message is sent to the GDC. The GDC is aware of the software available on the data loader (block 536) in the aircraft. A notification is then sent to the DLS App from the GDC that the aircraft is available for maintenance.

The DLS App is used to initiate a remote dataload by the GDC, which performs a GDC validation operation at 560. The GDC sends a command message, such as an ACARS message, to the CMF on the aircraft to start the dataload when the software update is available on the data loader. The CMF sends a dataload command to the data loader, which initiates the dataload to the LRU. A dataload status message is sent from the LRU to the data loader, which in turn sends the dataload status message to the CMF. The dataload status message is forwarded from the CMF to the GDC, such as through an ACARS message. The dataload status message is then sent from the GDC to the DLS App.

In an alternative updating method 600 depicted in FIG. 6, maintenance personnel, by way of a DLS App (block 610), interact with a GDC (block 620), which in turn operatively communicates with various aircraft components, including a CMF (block 630), a gateway (block 640), at least one LRU (block 650), and a data loader (block 660).

During method 600, the CMF monitors a broadcast discrete of an LRU operation state (normal mode or maintenance mode), and waits for a maintenance event of any LRU on the aircraft. For example, the aircraft level discrete for dataload can be used to trigger the dataload event (block 632). During a maintenance mode event, a specific LRU is identified for the update (block 634), and a datalink message such as an ACARS message is sent to the GDC. The GDC is aware of the software available on the data loader (block 636) in the aircraft. A notification is then sent to the DLS App from the GDC that the aircraft is available for maintenance.

The DLS App is used to initiate a remote dataload by the GDC, which performs a GDC validation operation at 660. The GDC sends a command message, such as an Internet protocol (IP) message, to the gateway on the aircraft to start the dataload when the software update is available on the data loader. The gateway sends a dataload command to the data loader, which initiates the dataload to the LRU. A dataload status message is sent from the LRU to the data loader, which in turn sends the dataload status message to the gateway. The dataload status message is forwarded from the gateway to the GDC, such as through an IP message. The dataload status message is then sent from the GDC to the DLS App.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a method for updating aircraft data, the method comprising: receiving one or more messages at a ground system that one or more aircraft is in a safe state on the ground; selecting one or more aircraft in the safe state to receive a software or database update from the ground system; verifying that the selected one or more aircraft in the safe state is in need of the software or database update; initiating a remote loading of the software or database update to the verified selected one or more aircraft in the safe state; and receiving one or more messages at the ground system from the verified selected one or more aircraft indicating a status of the remote loading.

Example 2 includes the method of Example 1, wherein the ground system comprises one or more database sources, and an operations center where a data loading software application is located.

Example 3 includes the method of any of Examples 1-2, wherein the ground system is in operative communication with a ground infrastructure comprising one or more Wi-Fi access points, a cellular communications infrastructure, or a satellite communications infrastructure.

Example 4 includes the method of Example 3, wherein the ground infrastructure is configured for operative communication with the one or more aircraft in the safe state on the ground.

Example 5 includes the method of Example 4, wherein the one or more aircraft includes an aircraft gateway, which is configured to communicate with the ground infrastructure through a wireless connection.

Example 6 includes the method of Example 5, wherein the aircraft gateway is in operative communication with an on-board data storage, which operatively communicates with one or more onboard target avionics.

Example 7 includes the method of Example 6, wherein a message received at the ground system that an aircraft is in a safe state on the ground, is sent from the aircraft gateway through the ground infrastructure.

Example 8 includes the method of Example 7, wherein the remote loading of the software or database update is initiated by the data loading software application.

Example 9 includes the method of Example 8, wherein the software or database update is received by the aircraft gateway and is sent to the on-board data storage.

Example 10 includes the method of Example 9, wherein the software or database update is sent from the on-board data storage to the one or more onboard target avionics.

Example 11 includes a system for updating aircraft data, the system comprising: at least one processor located in a ground operations center; and a non-transitory computer readable medium including instructions executable by the at least one processor to perform a method for updating aircraft data comprising: receiving one or more messages that one or more aircraft is in a safe state on the ground; selecting one or more aircraft in the safe state to receive a software or database update; verifying that the selected one or more aircraft in the safe state is in need of the software or database update; initiating a remote loading of the software or database update to the verified selected one or more aircraft in the safe state; and receiving one or more messages from the verified selected one or more aircraft indicating a status of the remote loading.

Example 12 includes the system of Example 11, wherein the ground operations center includes at least one database provider.

Example 13 includes the system of any of Examples 11-12, wherein the ground operations center is in operative communication with a ground infrastructure comprising one or more Wi-Fi access points, a cellular communications infrastructure, or a satellite communications infrastructure.

Example 14 includes the system of Example 13, wherein the ground infrastructure is configured for operative communication with the one or more aircraft in the safe state on the ground.

Example 15 includes the system of Example 14, wherein the one or more aircraft comprises: an onboard gateway configured to wirelessly communicate with the ground infrastructure; a data loader in operative communication with the onboard gateway; and an avionics system comprising: a communications management function in operative communication with the onboard gateway and the data loader; and one or more line replaceable units in operative communication with the communications management function and the data loader.

Example 16 includes the system of any of Examples 11-15, wherein the remote loading of the software or database update is initiated by a data loading software application located in the ground operations center.

Example 17 includes the system of any of Examples 15-16, wherein the remote loading of the software or database update comprises: sending an auto update command from the ground operations center to the communications management function through a datalink message; forwarding the auto update command from the communications management function to a line replaceable unit for which the software or database update is needed; saving the auto update command at the line replaceable unit until a maintenance mode for the line replaceable unit is entered; and when the maintenance mode is entered, sending a request from the line replaceable unit to the data loader to start the software or database update at the line replaceable unit.

Example 18 includes the system of any of Examples 15-16, wherein the remote loading of the software or database update comprises: sending a dataload update command from the ground operations center to the communications management function through a datalink message; and forwarding the dataload update command from the communications management function to the data loader to start the software or database update at a line replaceable unit for which the software or database update is needed.

Example 19 includes the system of any of Examples 15-16, wherein the remote loading of the software or database update comprises: sending a dataload update command from the ground operations center to the onboard gateway through the ground infrastructure; and forwarding the dataload update command from the onboard gateway to the data loader to start the software or database update at a line replaceable unit for which the software or database update is needed.

Example 20 includes a computer program product, comprising: a non-transitory computer readable medium including instructions executable by a processor to perform a method for updating aircraft data comprising: receiving one or more messages that one or more aircraft is in a safe state on the ground; selecting one or more aircraft in the safe state to receive a software or database update; verifying that the selected one or more aircraft in the safe state is in need of the software or database update; initiating a remote loading of the software or database update to the verified selected one or more aircraft in the safe state; and receiving one or more messages from the verified selected one or more aircraft indicating a status of the remote loading.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for updating aircraft data on one or more aircraft wherein each of the one or more aircraft comprises: an onboard gateway configured to wirelessly communicate with ground infrastructure; a data loader in operative communication with the onboard gateway; and an avionics system comprising: a communications management function in operative communication with the onboard gateway and the data loader; and one or more line replaceable units in operative communication with the communications management function and the data loader, the method comprising:

receiving one or more messages at a ground system that one or more aircraft are each parked at an airport terminal gate;

selecting, by the ground system, one or more aircraft parked at respective airport terminal gates to receive a software or database update from the ground system;

determining, by the ground system, whether each of the selected one or more aircraft will be parked at the respective airport terminal gates for an amount of time required to complete the software or database update;

for each of the selected one or more aircraft determined to be parked at the respective airport terminal gates for the required amount of time, verifying, by the ground system, that the selected one or more aircraft parked at the respective airport terminal gates is in need of the software or database update;

initiating, by the ground system, a remote loading of the software or database update to the verified selected one or more aircraft parked at the respective airport terminal gates, wherein the remote loading comprises:

sending an auto update command from the ground system to the communications management function through a datalink message;

forwarding the auto update command from the communications management function to the line replaceable unit for which the software or database update is needed;

saving the auto update command at the line replaceable unit until a different mode for the line replaceable unit is entered; and when the different mode is entered, sending a request from the line replaceable unit to the data loader to start the software or database update at the line replaceable unit; and receiving one or more messages at the ground system from the verified selected one or more aircraft indicating a status of the remote loading.

2. The method of claim 1, wherein the ground system comprises one or more database sources, and an operations center where a data loading software application is located.

3. The method of claim 2, wherein the ground system is in operative communication with a ground infrastructure comprising one or more Wi-Fi access points, a cellular communications infrastructure, or a satellite communications infrastructure.

4. The method of claim 3, wherein the ground infrastructure is configured for operative communication with the one or more aircraft parked at the respective airport terminal gates.

5. The method of claim 4, wherein the one or more aircraft includes an aircraft gateway, which is configured to communicate with the ground infrastructure through a wireless connection.

6. The method of claim 5, wherein the aircraft gateway is in operative communication with an on-board data storage, which operatively communicates with one or more onboard target avionics.

7. The method of claim 6, wherein a message received at the ground system that an aircraft is parked at a respective airport terminal gate, is sent from the aircraft gateway through the ground infrastructure.

8. The method of claim 7, wherein the remote loading of the software or database update is initiated by the data loading software application.

9. The method of claim 8, wherein the software or database update is received by the aircraft gateway and is sent to the on-board data storage.

10. The method of claim 9, wherein the software or database update is sent from the on-board data storage to the one or more onboard target avionics.

11. The method of claim 1, wherein the different mode is a maintenance mode.

12. A system for updating aircraft data on one or more aircraft wherein each of the one or more aircraft comprises: an onboard gateway configured to wirelessly communicate with ground infrastructure; a data loader in operative communication with the onboard gateway; and an avionics system comprising: a communications management function in operative communication with the onboard gateway and the data loader; and one or more line replaceable units in operative communication with the communications management function and the data loader, the system comprising:
at least one processor located in a ground operations center; and
a non-transitory computer readable medium including instructions executable by the at least one processor to perform a method for updating aircraft data comprising:
receiving one or more messages at the ground operations center that one or more aircraft are each parked at an airport terminal gate;
selecting, by the processor, one or more aircraft parked at respective airport terminal gates to receive a software or database update;
determining, by the processor, whether each of the selected one or more aircraft will be parked at the respective airport terminal gates for an amount of time required to complete the software or database update;
for each of the selected one or more aircraft determined to be parked at the respective airport terminal gates for the required amount of time, verifying, by the processor, that the selected one or more aircraft parked at the respective airport terminal gates is in need of the software or database update;
initiating, by the processor, a remote loading of the software or database update to the verified selected one or more aircraft parked at the respective airport terminal gates, wherein the remote loading comprises:
sending an auto update command from the ground operations center to the communications management function through a datalink message;
forwarding the auto update command from the communications management function to the line replaceable unit for which the software or database update is needed;
saving the auto update command at the line replaceable unit until a different mode for the line replaceable unit is entered; and
when the different mode is entered, sending a request from the line replaceable unit to the data loader to start the software or database update at the line replaceable unit; and
receiving one or more messages at the ground operations center from the verified selected one or more aircraft indicating a status of the remote loading.

13. The system of claim 12, wherein the ground operations center includes at least one database provider.

14. The system of claim 12, wherein the ground operations center is in operative communication with a ground infrastructure comprising one or more Wi-Fi access points, a cellular communications infrastructure, or a satellite communications infrastructure.

15. The system of claim 12, wherein the ground infrastructure is configured for operative communication with the one or more aircraft parked at the respective airport terminal gates.

16. The system of claim 12, wherein the remote loading of the software or database update is initiated by a data loading software application located in the ground operations center.

17. The system of claim 12, wherein the remote loading of the software or database update comprises: sending a dataload update command from the ground operations center to the communications management function through a datalink message; and forwarding the dataload update command from the communications management function to the data loader to start the software or database update at a line replaceable unit for which the software or database update is needed.

18. The system of claim 12, wherein the remote loading of the software or database update comprises: sending a dataload update command from the ground operations center to the onboard gateway through the ground infrastructure; and forwarding the dataload update command from the onboard gateway to the data loader to start the software or database update at a line replaceable unit for which the software or database update is needed.

19. The system of claim 12, wherein the different mode is a maintenance mode.

20. A computer program product, comprising:
a non-transitory computer readable medium including instructions executable by a processor to perform a method for updating aircraft data on one or more aircraft wherein each of the one or more aircraft comprises: an onboard gateway configured to wirelessly communicate with ground infrastructure; a data loader in operative communication with the onboard gateway; and an avionics system comprising: a communications management function in operative communication with the onboard gateway and the data loader, and one or more line replaceable units in operative communication with the communications management function and the data loader, comprising:

receiving one or more messages at a ground system that one or more aircraft are each parked at an airport terminal gate;

selecting, by the ground system, one or more aircraft parked at respective airport terminal gates to receive a software or database update from the ground system;

determining, by the ground system, whether each of the selected one or more aircraft will be parked at the respective airport terminal gates for an amount of time required to complete the software or database update;

for each of the selected one or more aircraft determined to be parked at the respective airport terminal gates for the required amount of time, verifying, by the ground system, that the selected one or more aircraft parked at the respective airport terminal gates is in need of the software or database update;

initiating, by the ground system, a remote loading of the software or database update to the verified selected one or more aircraft parked at the respective airport terminal gates, wherein the remote loading comprises:

sending an auto update command from the ground system to the communications management function through a datalink message;

forwarding the auto update command from the communications management function to the line replaceable unit for which the software or database update is needed;

saving the auto update command at the line replaceable unit until a different mode for the line replaceable unit is entered; and when the different mode is entered, sending a request from the line replaceable unit to the data loader to start the software or database update at the line replaceable unit; and receiving one or more messages at the ground system from the verified selected one or more aircraft indicating a status of the remote loading.

\* \* \* \* \*